United States Patent [19]
Klesen et al.

[11] Patent Number: 5,937,727
[45] Date of Patent: Aug. 17, 1999

[54] BRAKE SERVO DEVICE FOR MOTOR VEHICLES

[75] Inventors: Christof Klesen, Langgöns; Michael Vogt, Simmern, both of Germany

[73] Assignee: ITT Manufacturing Enterprises Inc., Wilmington, Del.

[21] Appl. No.: 08/952,559

[22] PCT Filed: May 23, 1996

[86] PCT No.: PCT/EP96/02290

§ 371 Date: Feb. 23, 1998

§ 102(e) Date: Feb. 23, 1998

[87] PCT Pub. No.: WO96/37393

PCT Pub. Date: Nov. 28, 1996

[51] Int. Cl.[6] .................................................. B60T 13/72
[52] U.S. Cl. ........................................ 91/367; 91/376 R
[58] Field of Search ................................ 91/367, 376 R

[56] References Cited

U.S. PATENT DOCUMENTS 5,493,946  2/1996  Schluter ........................... 91/376 R
5,605,088  2/1997  Balz et al. ......................... 91/376 R
5,658,055  8/1997  Dieringer et al. ..................... 188/356

FOREIGN PATENT DOCUMENTS 0 696 534   2/1996   European Pat. Off. .
44 05 092  12/1994   Germany .

*Primary Examiner*—Sheldon J. Richter
*Attorney, Agent, or Firm*—Rader, Fishman & Grauer PLLC

[57] ABSTRACT

A brake power booster for automotive vehicles has a control valve which is operable by a solenoid irrespective of the driver's wish. In order to adapt the force-travel characteristic curve of the solenoid to the consumer characteristic curve of the control valve exhibiting a drop in force, the present invention discloses an armature having two parts which are movable relative to each other and interact with stops that are axially offset in the housing of the solenoid in the actuating direction of the latter.

8 Claims, 1 Drawing Sheet

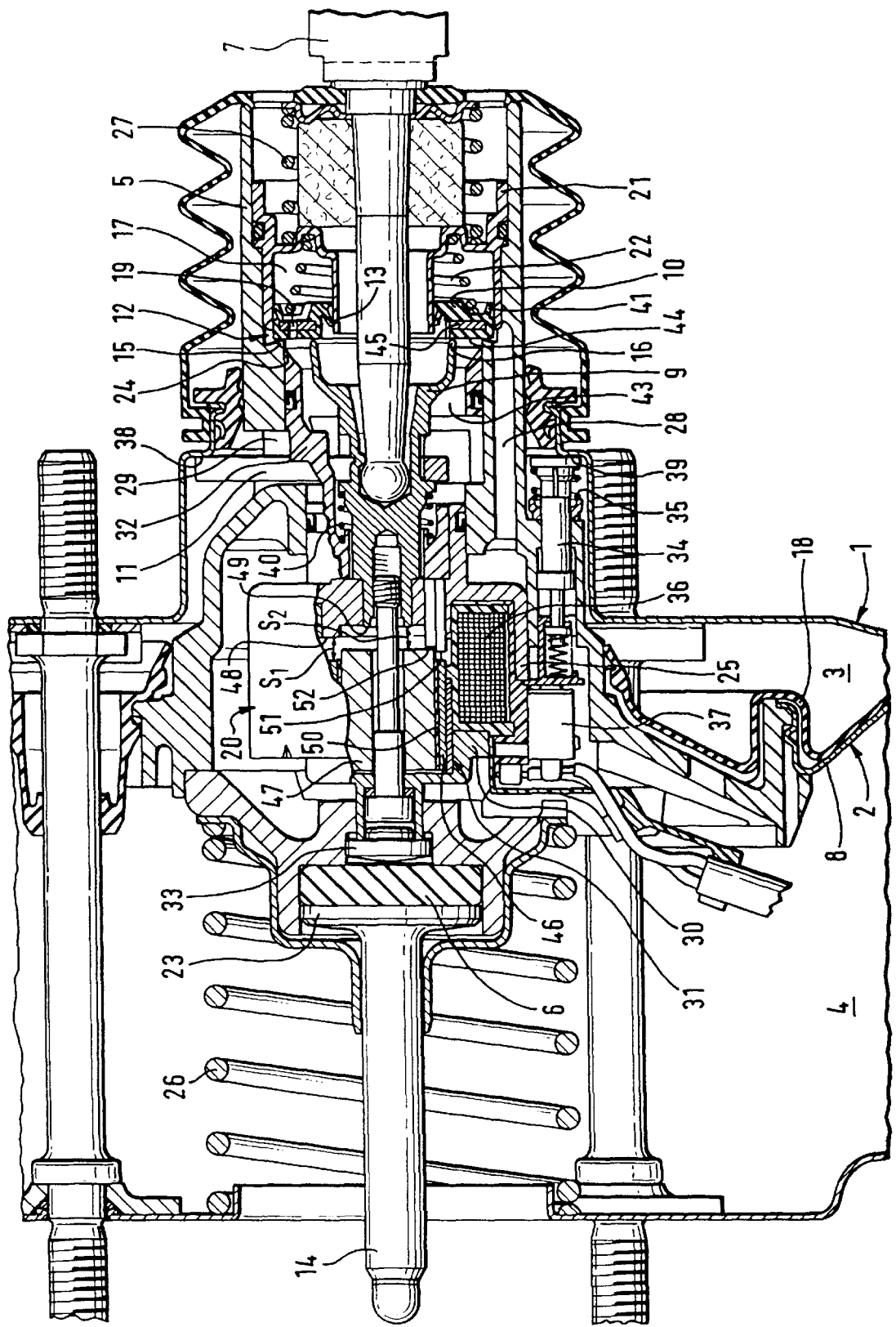

ND DESCRIPTION OF THE DRAWING

BRAKE SERVO DEVICE FOR MOTOR VEHICLES

BACKGROUND OF THE INVENTION

The present invention relates to a brake power booster for automotive vehicles including a booster housing having its interior subdivided by a movable wall into a first chamber (vacuum chamber) and a second chamber (working chamber), and a control valve which controls a pneumatic pressure differential that acts upon the movable wall, the control valve having at least two sealing seats, which interact with an elastic valve member, and being operable by an actuating rod, on the one hand, and by a solenoid irrespective of the actuating rod, on the other hand, the armature of the solenoid being in force-transmitting cooperation with one of the sealing seats.

A brake power booster of this type is disclosed in international patent application No. WO 94/11226, for example. A disadvantage in the prior art brake power booster is the drop of forces in the force-travel characteristic curve of the control valve which occurs especially during the inflow of outside air into the working chamber and causes instabilities. To adapt the course of the force characteristic curve of the solenoid to the mentioned consumer characteristic curve, a highly dynamic and precise, complicated control system is required which needs data about the actuating travel of a sleeve. The sleeve carries the sealing seat operable by the solenoid. A sophisticated sensor structure is required to this end.

Therefore, an object of the present invention is to disclose measures which permit eliminating the need for the sensor structure and simplifying the control system in addition. More particularly, the objective is to position unstable points on the consumer characteristic curve.

SUMMARY OF THE INVENTION

According to the present invention, this object will be achieved by the armature which includes two parts that are movable relative to each other and interact with stops which are axially offset in the housing of the solenoid in the actuating direction of the latter.

To specify the idea of the present invention, in a preferred aspect of the present invention, the armature is comprised of two cylindrical parts which are coaxial to each other and guided telescopically in each other, and the distance between the radially outwardly arranged part and its associated stop is smaller than the distance between the radially inwardly arranged part and its associated stop.

To minimize the friction which occurs between the two armature parts and to optimize the course of the magnetic flux, it is appropriate to provide an insulating sliding layer, e.g., a foil, between the two parts.

Preferably, the sealing seat of the control valve operable by the armature may be either that sealing seat opening of which permits ventilating the second chamber (working chamber). Or, the sealing seat may be a third sealing seat which is arranged concentrically to the sealing seats and, upon operation of the control valve by the solenoid, replaces the sealing seat in terms of function which, when opened, permits a pneumatic connection between the two chambers.

The present invention will the explained in detail in the following description making reference to an embodiment and the accompanying drawing.

BRIEF DESCRIPTION OF THE DRAWING

The only FIGURE in the drawing shows a longitudinal cross-sectional view of a design of the brake power booster of the present invention, partially broken off.

DETAILED DESCRIPTION OF THE DRAWING

The booster housing 1 (shown only schematically) of the vacuum brake power booster of the present invention (as shown) is subdivided by an axially movable wall 2 into a working chamber 3 and a vacuum chamber 4. The axially movable wall 2 includes a diaphragm plate 8, deep-drawn from sheet metal, and a flexible diaphragm 18 which abuts thereon (not shown). The diaphragm, configured as a rolling diaphragm, provides a sealing between the outside periphery of the diaphragm plate 8 and the booster housing 1.

A control valve 12 operable by an actuating rod 7 is accommodated in a control housing 5, which is sealed and guided in the booster housing 1 and carries the movable wall 2. The control valve 12 is composed of a first sealing seat 15 provided on the control housing 5, a second sealing seat 16 provided on a valve piston 9 coupled to the actuating rod 7, as well as a valve member 10 cooperating with the two sealing seats 15, 16. Valve member 10 is guided in a guide part 21 sealed in control housing 5 and is urged against the valve seats 15, 16 by a valve spring 22 which is supported on the guide part 21. The working chamber 3 is connectable to the vacuum chamber 4 through a channel 28 which extends laterally in the control housing 5.

By way of a rubber-elastic reaction disc 6 abutting on the frontal end of the control housing 5 and a push rod 14 including a head flange 23, the brake force is transmitted onto an actuating piston of a non-illustrated master cylinder of the brake system. The master cylinder is arranged on the vacuum-side booster housing half not shown.

A resetting spring 26, illustrated schematically in the drawing and supported on the vacuum-side front wall of the booster housing 1, keeps the movable wall 2 in the initial position shown. Further, there is provision of a second compression spring or piston-rod return spring 27 which is supported indirectly on the actuating rod 7, on the one hand, and on the guide part 21, on the other hand. The force of spring 27 causes the valve piston 9 or its sealing seat 16 to be biased in relation to the valve member 10.

To connect the working chamber 3 to the atmosphere when the control valve 12 is actuated, finally, a channel 29, which extends in a generally radial direction, is provided in the control housing 5. The return movement of the valve piston 9 at the end of a braking operation is limited by a transverse member 11 which, in the release position of the vacuum brake power booster shown in the drawing, abuts on a stop 38 provided in the booster housing 1.

Further, as can be gathered from the drawing, the valve member 10 includes an annular sealing surface 44 which cooperates with the two sealing seats 15, 16. Sealing surface 44 is reinforced by means of a metal reinforcing disc 45 and has a plurality of axial ducts 19. In addition, the valve member 10 has a radially inwardly arranged sealing lip 13 and a radially outwardly arranged second sealing lip 41 which, in the mounted condition of the valve member 10 in the control housing 5, are in sealing abutment with the previously mentioned guide part 21 that guides the valve member 10. This confines a pneumatic chamber 17 in the control housing 5. The flow channels which are formed by the ducts 19 and the openings in the sealing surface 44 (not referred to in detail) connect the pneumatic chamber 17 with an annular chamber 43 which is confined by the sealing seats 15, 16 and opening into which is the above-mentioned pneumatic channel 29. Thus, the pneumatic chamber 17 which is provided on the side of the valve member 10 remote from the sealing surface 44, is in constant communication with the working chamber 3, and pressure compensation takes place at the valve member 10.

Consequently, the arrangement described permits reducing the difference between the reaction force of the brake power booster and the resetting force acting at the valve piston to the effect that, with the reaction force remaining the same, an increase in the resetting force is possible or, with the resetting force remaining the same, a reduction in the reaction force is possible. As a result, the hysteresis of the brake power booster according to the present invention is improved.

To initiate an independent actuation of the vacuum brake power booster according to the present invention which is irrespective of the actuating rod 7, a third sealing seat 24 is interposed radially between the first (15) and the second sealing seat 16. Sealing seat 24 is operable by means of a solenoid 20 which, preferably, is arranged in a housing 25 rigidly connected to the valve piston 9 and, consequently, is displaceable together with the valve piston 9 in the control housing 5. The solenoid 20 includes a coil 36 arranged within the housing 25 and a cylindrical armature 31 which is axially slidably arranged therein. Armature 31 is partly guided in a closure part 30 that closes the housing 25 and on which a sleeve 32 is supported that carries the above mentioned third sealing seat 24. Armature 12 includes two coaxially arranged parts 46, 47 which are telescopically guided in each other. A foil 50 is interposed between the parts 46, 47. Associated with the radially outwardly arranged armature part 46, having an axial overall length which is smaller than the length of the inwardly arranged armature part 47, is a stop 48 in the housing 25 of the solenoid 20. The inwardly arranged armature part 47 is movable into engagement with a second stop 49. Preferably, the arrangement of the two stops 48, 49 is so that the actuating travel $S_1$ of the radially outward armature part 46 is shorter than the actuating travel $S_2$ of the radially inward armature part 47. Both armature parts 46, 47 cooperate with axially offset stop surfaces 51, 52 on the sleeve 32.

Interposed between the valve piston 9 and the sleeve 32 is a compression spring 40 which biases the sleeve 32 in opposition to its actuating direction. Thus, the third sealing seat 24 is arranged in an axially offset manner with respect to the second sealing seat 16 on the valve piston 9. The closure part 30 guided in the control housing 5 abuts the above mentioned reaction disc 6, by the intermediary of a transmission disc 33, and permits transmitting the input force introduced at the actuating rod 7 to the reaction disc 6.

Finally, electric switching means 37, 38 are provided in the brake power booster design of the present invention shown in the drawing. Means 37, 38 are especially important in braking operations where the solenoid 20 is driven in addition to the operation by the driver in order to effect an emergency stop irrespective of the driver's wish (so-called brake assistant function). It is of special significance that the switching means 37, 38 are actuated during each braking operation. It must be ensured simultaneously that the solenoid 20 is reliably deactivated upon termination of the braking operation assisted by independent force. The switching means shown include a microswitch 37, which is preferably attached to the valve piston 9 of the housing 25 or the solenoid 20 and has two switch positions, and an actuating element 34. Element 34 actuates the microswitch 37 by a translatory movement. Element 34 is sealed and guided in a bore in the control housing 5 and cooperates with a stop on the booster housing. The stop is assigned reference numeral 39 and may be configured as a radial collar on the rear booster housing half. A compression spring 35 is interposed between the actuating element 34 and the control housing 5 so that the end of the actuating element 34 remote from the microswitch 37 is biased to bear against stop 39.

In the event of an independent operation of the brake power booster initiated by energization of the coil 36 of the solenoid 20, both the outward (46) and the inward armature part 47 starts to move. When the outward armature part 46 is seated on the stop surface 51 of the force-transmitting sleeve 32, the movement will be slowed down by the counteracting force of the compression spring 40. When the force generated by the solenoid 20 is in excess of the counteracting force, the force-transmitting sleeve 32 starts to move to the right. The inward armature part 47 furnishes only a very small share in force because its air gap or distance $S_2$ from stop 49 is still very large. When the outward armature part 46 has covered the travel $S_1$, it will move into abutment with stop 48 in the housing 25.

When the amount of current supplied to the solenoid 20 is sufficient to provide magnetic saturation of the outward armature part 46, the inward armature part 47 will start to act so that the force-transmitting sleeve 32 can be moved further to the right until the inward armature part 47 will also move into abutment with the stop 49.

Thus, a point on the consumer characteristic curve which corresponds to a defined opening of the control valve can be positioned by the stop 48 which is adjusted by way of the actuating travel $S_1$ of the outward armature part 46. In the embodiment shown in the drawing, the pressure which develops in the master cylinder (not shown) rises until a value that is determined by the current. Simultaneously, the counteracting force of the control valve increases due to the changed pneumatic pressure conditions, and the control valve closes again.

List of Reference Numerals 1 booster housing
2 movable wall
3 working chamber
4 vacuum chamber
5 control housing
6 reaction disc
7 actuating rod
8 diaphragm plate
9 valve piston
10 valve member
11 transverse member
12 control valve
13 sealing lip
14 push rod
15 sealing seat
16 sealing seat
17 chamber
18 rolling diaphragm
19 duct
20 solenoid
21 guide part
22 valve spring
23 head flange
24 sealing seat
25 housing
26 resetting spring
27 piston rod return spring
28 channel
29 channel
30 closure part 31 armature
32 sleeve
33 transmission disc
34 actuating element
35 spring
36 coil
37 microswitch
38 stop
39 stop
40 spring
41
42
43 annular chamber
44 sealing surface
45 reinforcing disc
46 part
47 part
48 stop
49 stop
50 sliding layer, foil
51 stop surface
52 stop surface

We claim:

1. Pneumatic brake power booster for automotive vehicles including a booster housing having an interior which is subdivided by a movable wall into a first chamber and a second chamber, and a control valve which controls a pneumatic pressure differential that acts upon the movable wall, the control valve having at least two sealing seats, which interact with an elastic valve member, and, on the one hand, being operable by an actuating rod and, on the other hand, irrespective of the actuating rod, by a solenoid having an armature, the armature of the solenoid being movable in an actuating direction and in force-transmitting cooperation with one of the sealing seats, wherein the armature includes two parts movable relative to each other which interact with stops that are axially offset in the housing of the solenoid in the actuating direction of the armature.

2. Brake power booster as claimed in claim 1, wherein the sealing seat being in force-transmitting cooperation with the armature is a sealing seat which, when opened, permits ventilating the second chamber.

3. Brake power booster as claimed in claim 1, wherein the sealing seat operable by the armature is a third sealing seat which is arranged concentrically to said two sealing seats and, upon operation of the control valve by the solenoid, replaces that one of the sealing seats in terms of function which, when opened, permits a pneumatic connection between the two chambers.

4. Brake power booster as claimed in claim 3, wherein the third sealing seat is provided on a force-transmitting sleeve displaceable by the armature, wherein stop surfaces on the sleeve which interact with a part of the armature are axially offset in the actuating direction of the force-transmitting sleeve.

5. Brake power booster as claimed in claim 1, wherein the armature is comprised of two cylindrical parts which are coaxial to each other and guided telescopically in each other, and the distance between the radially outwardly arranged part and its associated stop is smaller than the distance between the radially inwardly arranged part and its associated stop.

6. Brake power booster as claimed in claim 5, wherein a sliding layer, is interposed between the two cylindrical parts.

7. Brake power booster as claimed in claim 5, wherein the two parts of the armature differ in length.

8. Brake power booster as claimed in claim 7, wherein the overall axial length of the radially inward armature part is in excess of the length of the radially outward armature part.

* * * * *